(12) United States Patent
Zhou et al.

(10) Patent No.: US 12,022,315 B2
(45) Date of Patent: *Jun. 25, 2024

(54) AVOIDING TCI RESELECTION DUE TO ACTIVE BWP SWITCHING

(71) Applicant: QUALCOMM Incorporated, San Diego, CA (US)

(72) Inventors: Yan Zhou, San Diego, CA (US); Alexandros Manolakos, Escondido, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,667

(22) Filed: Dec. 22, 2022

(65) Prior Publication Data
US 2023/0217292 A1 Jul. 6, 2023

Related U.S. Application Data

(63) Continuation of application No. 16/831,541, filed on Mar. 26, 2020, now Pat. No. 11,540,158.
(Continued)

(51) Int. Cl.
*H04W 24/10* (2009.01)
*H04L 5/00* (2006.01)
(Continued)

(52) U.S. Cl.
CPC ............ *H04W 24/10* (2013.01); *H04L 5/001* (2013.01); *H04L 5/0048* (2013.01);
(Continued)

(58) Field of Classification Search
CPC ....... H04W 24/10; H04L 5/001; H04L 5/0048
See application file for complete search history.

(56) References Cited

U.S. PATENT DOCUMENTS

| | | | |
|---|---|---|---|
| 9,019,836 | B2 | 4/2015 | Klingenbrunn et al. |
| 10,893,431 | B2 | 1/2021 | Liou et al. |
| | | (Continued) | |

FOREIGN PATENT DOCUMENTS

| | | | |
|---|---|---|---|
| CN | 109076364 A | 12/2018 | |
| CN | 109076560 A | 12/2018 | |
| | (Continued) | | |

OTHER PUBLICATIONS

Taiwan Search Report—TW109110494—TIPO—dated Apr. 24, 2023, 1 Page.
(Continued)

*Primary Examiner* — Kevin C. Harper
(74) *Attorney, Agent, or Firm* — Shumaker & Sieffert, P. A.

(57) ABSTRACT

Certain aspects of the present disclosure provide techniques for avoiding transmission configuration indication (TCI) reselection (e.g., due to some bandwidth part (BWP) switching scenarios). An exemplary method generally includes configuring a UE with TCI state information for communication via multiple BWPs, wherein the TCI state information indicates quasi co-location (QCL) assumptions of at least first and second types and determining whether to reconfigure the TCI state of the UE to reflect a BWP switch, based on one or more rules that define BWP switching for reference signals (RSs) of at least one of the QCL assumption types without TCI state reconfiguration. Other aspects and embodiments are also claimed and described.

25 Claims, 7 Drawing Sheets

Related U.S. Application Data

(60) Provisional application No. 62/826,953, filed on Mar. 29, 2019, provisional application No. 62/826,907, filed on Mar. 29, 2019, provisional application No. 62/826,918, filed on Mar. 29, 2019.

(51) Int. Cl.
| | |
|---|---|
| H04B 7/0408 | (2017.01) |
| H04W 72/0453 | (2023.01) |
| H04W 72/23 | (2023.01) |
| H04W 76/11 | (2018.01) |
| H04W 76/27 | (2018.01) |

(52) U.S. Cl.
CPC .......... *H04B 7/0408* (2013.01); *H04L 5/0053* (2013.01); *H04W 72/0453* (2013.01); *H04W 72/23* (2023.01); *H04W 76/11* (2018.02); *H04W 76/27* (2018.02)

(56) References Cited

U.S. PATENT DOCUMENTS

| | | |
|---|---|---|
| 11,057,184 B2 | 7/2021 | Orsino et al. |
| 11,240,867 B2 | 2/2022 | Abdoli et al. |
| 11,510,082 B2 | 11/2022 | Zhou et al. |
| 11,540,158 B2 | 12/2022 | Zhou et al. |
| 2018/0288746 A1 | 10/2018 | Zhang et al. |
| 2019/0058517 A1 | 2/2019 | Kang et al. |
| 2019/0174466 A1 | 6/2019 | Zhang et al. |
| 2019/0239093 A1 | 8/2019 | Zhang et al. |
| 2019/0393989 A1 | 12/2019 | Jung et al. |
| 2020/0045569 A1 | 2/2020 | Seo et al. |
| 2020/0137588 A1 | 4/2020 | Zhang et al. |
| 2020/0267571 A1 | 8/2020 | Park et al. |
| 2020/0288479 A1 | 9/2020 | Xi et al. |
| 2020/0359459 A1 | 11/2020 | Kakishima et al. |
| 2020/0389883 A1 | 12/2020 | Faxer et al. |
| 2020/0404690 A1 | 12/2020 | Lee et al. |
| 2021/0014848 A1 | 1/2021 | Davydov et al. |
| 2021/0045149 A1 | 2/2021 | Davydov et al. |
| 2021/0160835 A1* | 5/2021 | Gao ............... H04W 72/23 |
| 2021/0168030 A1 | 6/2021 | Li |
| 2021/0212036 A1 | 7/2021 | Wu et al. |
| 2021/0359902 A1 | 11/2021 | Chen et al. |
| 2021/0385807 A1 | 12/2021 | Rahman et al. |
| 2022/0151012 A1 | 5/2022 | Abdoli et al. |
| 2023/0094839 A1 | 3/2023 | Zhou et al. |
| 2023/0269030 A1 | 8/2023 | Jung et al. |

FOREIGN PATENT DOCUMENTS

| | | |
|---|---|---|
| CN | 110785958 A | 2/2020 |
| CN | 111615805 A | 9/2020 |
| CN | 112514308 A | 3/2021 |
| EP | 3451553 A2 | 3/2019 |
| EP | 3741066 A1 | 11/2020 |
| EP | 3833081 A1 | 6/2021 |
| EP | 3811553 A4 | 7/2021 |
| KR | 20190143733 A | 12/2019 |
| NO | 2019245236 A1 | 12/2019 |
| RU | 2758705 C1 | 11/2021 |
| TW | 201902158 A | 1/2019 |
| TW | 201911896 A | 3/2019 |
| WO | 2013116040 A2 | 8/2013 |
| WO | 2018232090 A1 | 12/2018 |
| WO | 2019017751 A1 | 1/2019 |
| WO | 2019143900 A1 | 7/2019 |
| WO | 2020019351 A1 | 1/2020 |
| WO | 2020119892 A1 | 6/2020 |
| WO | 2020143909 A1 | 7/2020 |
| WO | 2020168296 A1 | 8/2020 |
| WO | 2021051402 A1 | 3/2021 |
| WO | 2021078258 A1 | 4/2021 |
| WO | 2021246838 A1 | 12/2021 |
| WO | 2022072830 A1 | 4/2022 |
| WO | 2022132631 A1 | 6/2022 |
| WO | 2022155198 A1 | 7/2022 |
| WO | 2022164999 A1 | 8/2022 |
| WO | 2022249742 A1 | 12/2022 |

OTHER PUBLICATIONS

"3rd Generation Partnership Project; Technical Specification Group Radio Access Network, NR; Radio Resource Control (RRC) protocol specification (Release 15)", 3GPP Standard; Technical Specification; 3GPP TS 38.331, 3rd Generation Partnership Project, Mobile Competence Centre, 650, Route Des Lucioles, F-06921, Sophia-Antipolis Cedex, France, vol. RAN WG2, No. V15.1.0, Apr. 2, 2018, pp. 1-268, XP051450735.

AT&T: "TCI States Configuration Design to Support Dynamic BWP Switching", 3GPP Draft; R1-1800582, 3GPP TSG RAN WG1 Meeting NR AH 1801, TCI States Configuration Design to Support Dynamic BWP Switching, 3rd Generation Partnership Project (3GPP), Mobile Competence Centre, 650, Route Des Lucioles; F-06921 Sophia-Antipolis Cedex, France, vol. RAN WG1, No. Vancouver, Canada; Jan. 22, 2018-Jan. 26, 2018, Jan. 13, 2018 (Jan. 13, 2018), 1 Page, XP051384941.

Ericsson: "Clarification for Handling TCI State ID", 3GPP Draft, 3G PP TSG-RAN WG2 #105, R2-1901508, Clarification on TCI State ID, 3rd Generation Partnership Project (3GPP), Mobile Competence Centre, 650, Route Des Lucioles, F-06921 Sophia-Antipolis Cedex, France, vol. RAN WG2, No. Athens, Greece, Feb. 25, 2019-Mar. 1, 2019, Feb. 14, 2019 (Feb. 14, 2019), XP051602866, 6 pages.

Ericsson: "Maintenance for Beam Management", 3GPP Draft, 3GPP TSG-RAN WG1 Meeting #94, Tdoc R1-1809197, Maintenance for Beam Management, 3rd Generation Partnership Project (3GPP), Mobile Competence Centre, 650, Route Des Lucioles, F-06921 Sophia-Antipolis Cedex, France, vol. RAN WG1, No. Gothenburg, Sweden, Aug. 20, 2018-Aug. 24, 2018, Aug. 11, 2018 (Aug. 11, 2018), XP051516567, 10 pages.

International Search Report and Written Opinion—PCT/US2020/025525—ISA/EPO—dated Jun. 18, 2020, 14 Pages.

Oppo, et al., "Prevent BWP Switching for PDSCH/PUSCH Transmission", 3GPP Draft, 3GPP TSG-RAN2 #101, R2-1801761—Prevent BWP Switching for POSCH or PUSCH Transmission, 3rd Generation Partnership Project (3GPP), Mobile Competence Centre, 650, Route Des Lucioles, F-06921, Sophia-Antipolis Cedex, France, vol. RAN WG2, No. Athens, Greece, Feb. 26, 2018-Mar. 2, 2018, Feb. 13, 2018 (Feb. 13, 2018), XP051398954, 4 pages.

Prosecution History for U.S. Appl. No. 01/192,074 dated from Aug. 18, 2021, through Jul. 26, 2022, 99 Pages.

Qualcomm Incorporated: "Beam Management for NR", 3GPP Draft, 3GPP TSG-RAN WG1 Meeting 93, R1-1807341 Beam Management For NR, 3rd Generation Partnership Project (3GPP), Mobile Competence Centre, 650, Route Des Lucioles, F-06921 Sophia-Antipolis Cedex, France, vol. RAN WG1, No. Busan, Korea, May 21, 2018-May 25, 2018, May 20, 2018 (May 20, 2018), XP051442533, pp. 1-11.

Qualcomm Incorporated: "Remaining Details on QCL", 3GPP TSG RAN WG1 Meeting #91, 3GPP Draft, 3GPP TSG RAN WG1 Meeting #91, R1-1720672, 3rd Generation Partnership Project (3GPP), Mobile Competence Centre, 650, Route Des Lucioles, F-06921 Sophia-Antipolis Cedex, France, vol. RAN WG1, No. Reno, Nevada, USA; Nov. 27, 2017-Dec. 1, 2017, Nov. 18, 2017 (Nov. 18, 2017), pp. 1-9, XP051370133.

ZTE, et al., "Remaining Details on QCL", 3GPP Draft, 3GPP TSG RAN WG1 Meeting #91, R1-1719546, Remaining Details on QCL, 3rd Generation Partnership Project (3GPP), Mobile Competence Centre, 650, Route Des Lucioles, F-06921, Sophia-Antipolis Cedex, France, vol. RAN WG1, No. Reno, USA, Nov. 27, 2017-Dec. 1, 2017, Nov. 18, 2017 (Nov. 18, 2017), XP051369360, pp. 1-4.

3GPP TS 38.331: "3rd Generation Partnership Project; Technical Specification Group Radio Access Network; NR; Radio Resource Control (RRC) Protocol Specification (Release 15)", DRAFT_38331-F60, 3rd Generation Partnership Project, Mobile Competence Cen-

(56) References Cited

OTHER PUBLICATIONS tre, 650, Route Des Lucioles, F-06921, Sophia-Antipolis Cedex, France, vol. RAN WG2, V15.6.0 (Jun. 2019), Jun. 22, 2019 (Jun. 22, 2019), XP051751335, pp. 1-517.
Huawei, et al., "Remaining Issues on UCI Multiplexing", 3GPP TSG RAN WG1 Meeting #92, R1-1801341, Athens, Greece, Feb. 26-Mar. 2, 2018, 8 Pages, Feb. 17, 2018.

* cited by examiner

```
TCI-State ::=       SEQUENCE {
    tci-StateId         TCI-StateId,
    qcl-Type1           QCL-Info,
    qcl-Type2           QCL-Info                                OPTIONAL,   -- NEED R
    ...
}
QCL-Info ::=        SEQUENCE {
    cell                ServCellIndex                           OPTIONAL,   -- NEED R
    bwp-Id              BWPId                                   OPTIONAL,   -- Cond CSI-RS-Indicated
    referenceSignal     CHOICE {
        csi-rs              NZP-CSI-RS-ResourceId,
        ssb                 SSB-Index
    },
    qcl-Type            ENUMERATED {typeA, typeB, typeC, typeD},
    ...
}
```

FIG. 3

AVOIDING TCI RESELECTION DUE TO ACTIVE BWP SWITCHING

CROSS-REFERENCE TO RELATED APPLICATIONS

This application claims benefit of and priority to U.S. Non-Provisional application Ser. No. 16/831,541, filed Mar. 26, 2020, to U.S. Provisional Application No. 62/826,918, filed Mar. 29, 2019, to U.S. Provisional No. 62/826,907, filed Mar. 29, 2019, and to U.S. Provisional Application No. 62/826,953, filed Mar. 29, 2019, all four of which are hereby assigned to the assignee hereof and hereby expressly incorporated by reference herein in their entireties as if fully set forth below and for all applicable purposes.

FIELD OF THE DISCLOSURE

Aspects of the present disclosure relate to wireless communications, and more particularly, to techniques for avoiding transmission configuration indication reselection due to bandwidth part switching. Some aspects and techniques can be used to reduce signaling overhead and save power at certain devices within a communications network.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

As demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a network entity. The method generally includes configuring a UE with transmission configuration indication (TCI) state information for communication via multiple bandwidth parts (BWPs). TCI state information may indicate quasi co-location (QCL) assumptions of at least first and second types. The method may also include determining whether to reconfigure the TCI state of the UE to reflect a BWP switch. The determination may be based on one or more rules. In some cases, the one or more rules may define BWP switching for reference signals (RSs) of at least one of the QCL assumption types without TCI state reconfiguration.

Certain aspects provide an apparatus for wireless communications by a network entity. The apparatus generally includes at least one processor configured to configure a UE with transmission configuration indication (TCI) state information for communication via multiple bandwidth parts (BWPs). The TCI state information may indicate quasi co-location (QCL) assumptions of at least first and second types. Additionally or alternatively, the at least one processor may be further configured to determine whether to reconfigure the TCI state of the UE to reflect a BWP switch. The determination may be based on one or more rules. In some cases, the one or more rules define BWP switching for reference signals (RSs) of at least one of the QCL assumption types without TCI state reconfiguration. The apparatus also generally includes a memory coupled with the at least one processor.

Certain aspects provide an apparatus for wireless communications by a network entity. The apparatus generally includes means for configuring a UE with transmission configuration indication (TCI) state information for communication via multiple bandwidth parts (BWPs). The TCI state information may indicate quasi co-location (QCL) assumptions of at least first and second types. Additionally or alternatively, the apparatus may further include means for determining whether to reconfigure the TCI state of the UE to reflect a BWP switch. In some cases, the determination may be based on one or more rules. In some cases, the one or more rules may define BWP switching for reference signals (RSs) of at least one of the QCL assumption types without TCI state reconfiguration.

Certain aspects provide a non-transitory computer-readable medium for wireless communications by a network entity. The non-transitory computer-readable medium generally includes instructions that, when executed by at least one processor, cause the at least one processor to configure a UE with transmission configuration indication (TCI) state information for communication via multiple bandwidth parts (BWPs). The TCI state information may indicate quasi co-location (QCL) assumptions of at least first and second types. Additionally or alternatively, the non-transitory computer-readable medium may further include instructions that cause the at least one processor to determine whether to reconfigure the TCI state of the UE to reflect a BWP switch. The determination may be based on one or more rules. In some cases, the one or more rules define BWP switching for reference signals (RSs) of at least one of the QCL assumption types without TCI state reconfiguration.

Certain aspects provide a method for wireless communications by a user equipment (UE). The method generally includes receiving transmission configuration indication (TCI) state information for communication via multiple bandwidth parts (BWPs). The TCI state information may indicate quasi co-location (QCL) assumptions of at least first and second types. Additionally or alternatively, the method may further comprise monitoring, according to a BWP switch, for at least a first reference signal (RS) of at least one of the QCL assumption types without TCI state reconfiguration.

Certain aspects provide an apparatus for wireless communications by a user equipment (UE). The apparatus generally includes at least one processor configured to receive transmission configuration indication (TCI) state information for communication via multiple bandwidth parts (BWPs). The TCI state information may indicate quasi co-location (QCL) assumptions of at least first and second types. Additionally or alternatively, the at least one processor may be further configured to monitor, according to a BWP switch, for at least a first reference signal (RS) of at least one of the QCL assumption types without TCI state reconfiguration. The apparatus may also generally include a memory coupled with the at least one processor.

Certain aspects provide an apparatus for wireless communications by a user equipment (UE). The apparatus generally includes means for receiving transmission configuration indication (TCI) state information for communication via multiple bandwidth parts (BWPs). The TCI state information may indicate quasi co-location (QCL) assumptions of at least first and second types. Additionally or alternatively, the apparatus may further include means for monitoring, according to a BWP switch, for at least a first reference signal (RS) of at least one of the QCL assumption types without TCI state reconfiguration.

Certain aspects provide a non-transitory computer-readable medium for wireless communications by a user equipment (UE). The non-transitory computer-readable medium generally includes instructions that, when executed by at least one processor, cause the at least one processor to receive transmission configuration indication (TCI) state information for communication via multiple bandwidth parts (BWPs). The TCI state information may indicate quasi co-location (QCL) assumptions of at least first and second types. Additionally or alternatively, the non-transitory computer-readable medium may further include instructions that cause the at least one processor to monitor, according to a BWP switch, for at least a first reference signal (RS) of at least one of the QCL assumption types without TCI state reconfiguration.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 illustrates example transmission configuration indication (TCI) state configuration in accordance with certain aspects of present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
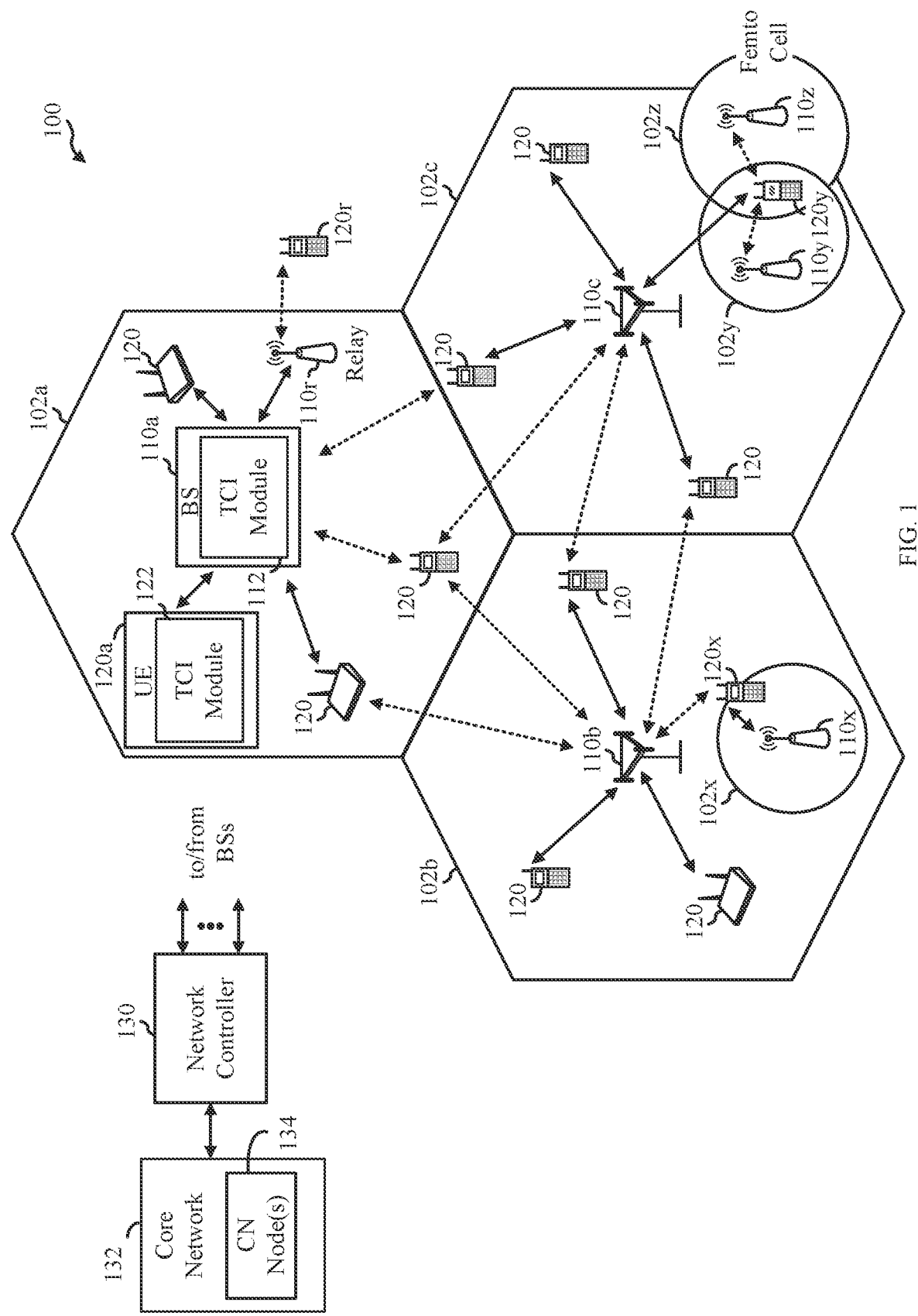
FIG. 1 is a block diagram conceptually illustrating an example telecommunications system, in accordance with certain aspects of the present disclosure.

Aspects of the present disclosure provide techniques for avoiding transmission configuration indication (TCI) reselection due to bandwidth part (BWP) switching. For example, due to current restrictions, many times when an active BWP (e.g., used by a user equipment (UE)) containing a particular type of quasi-colocated (QCL) of RS changes, a gNB must choose a new TCI state for the UE. This may occur even though only a BWP ID parameter may change within the TCI state configuration information due to the change in active BWP. This issue generally leads to inefficiencies of resource usage in a network. One unfavored result of TCI re-selection includes signaling overhead and power spent at a UE having to receive and decode additional signaling.

Thus, as noted, aspects of the present disclosure provide techniques, apparatus, processing systems, and computer readable media, for avoiding TCI state reselecting/reconfiguration. Though reselection/reconfiguration may be due to active BWP switching in some instances, other states can also cause this behavior. Avoiding TCI state reselection and reconfiguration may result in reduce signaling overhead and power savings for communication devices (e.g., UEs and BSs).

The following description provides examples of techniques for avoiding TCI reselection (e.g., due to BWP switching), and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. For clarity, while aspects may be described herein using terminology commonly associated with 3G, 4G, and/or 5G new radio (NR) wireless technologies, aspects of the present disclosure can be applied in other generation-based communication systems, including later technologies.

NR may utilize orthogonal frequency division multiplexing (OFDM) on the downlink and/or uplink and single-carrier frequency division multiplexing (SC-FDM) on the uplink and/or downlink. NR may support half-duplex operation using time division duplexing (TDD). OFDM and SC-FDM partition the system bandwidth into multiple orthogonal subcarriers, are referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. For example, the based subcarrier spacing (SCS) may be 15 kHz and other SCS may be defined with respect to the base SCS (e.g., 30 kHz, 60 kHz, 120 kHz, 240 kHz, etc.). The minimum resource allocation (e.g., a resource block (RB)) may be 12 consecutive subcarriers (or 180 kHz). The system bandwidth may also be partitioned into subbands covering multiple RBs. In NR, a subframe is 1 ms, but the basic transmission time interval (TTI) is referred to as a slot. A subframe contains a variable number of slots (e.g., 1, 2, 4, 8, 16, . . . slots) depending on the SCS. The symbol, slot lengths, and CP scale with the SCS.

NR may support beamforming and beam direction may be dynamically configured. Multiple-input multiple-output (MIMO) transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for avoiding transmission configuration indication (TCI) reselection. In some instances, such reselection may be due to bandwidth part switching. As shown in FIG. 1, the BS 110a includes a TCI module 112. The TCI module 112 may be configured to perform the operations illustrated in one or more of FIG. 4A, as well as other operations disclosed herein for avoiding TCI reselection due to bandwidth part switching, in accordance with aspects of the present disclosure. Additionally, as shown in FIG. 1, the UE 120a includes a TCI module 122. The TCI module 122 may be configured to perform the operations illustrated in FIG. 4B, as well as other operations disclosed herein for avoiding TCI reselection due to bandwidth part switching, in accordance with aspects of the present disclosure.

Figure 2:
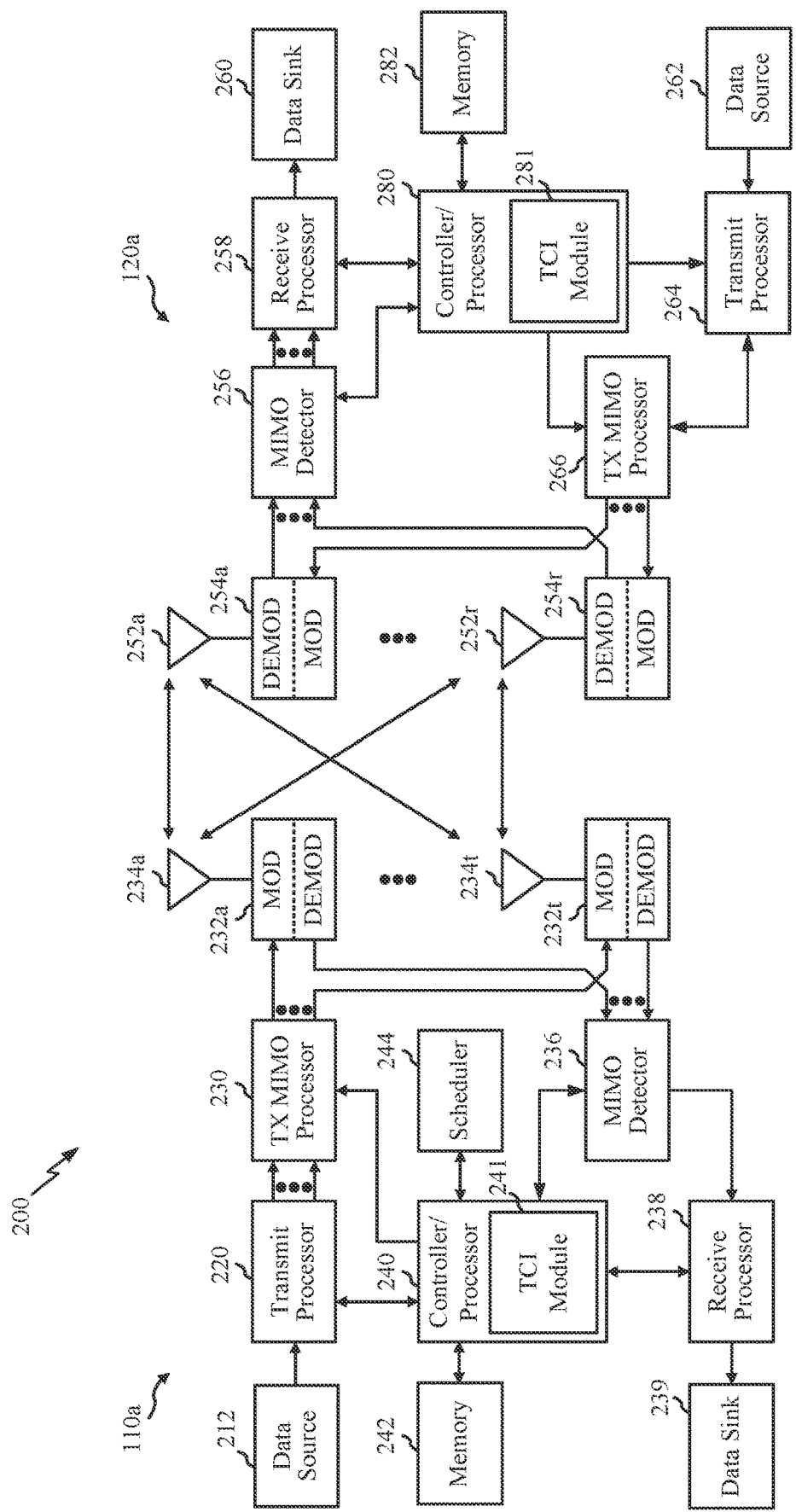
FIG. 2 is a block diagram illustrating an example architecture of a distributed radio access network (RAN), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PS SCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, down convert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a includes a TCI module 241 that may be configured to perform the operations illustrated in one or more of FIG. 4A, as well as other operations disclosed herein for avoiding TCI reselection due to bandwidth part switching, according to aspects described herein. As shown in FIG. 2, the controller/processor 280 of the UE 120a includes TCI module 281 that may be configured to perform the operations illustrated in one or more of FIGS. 4B, as well as other operations disclosed herein for avoiding TCI reselection due to bandwidth part switching, according to aspects described herein. Although shown at the Controller/Processor, other components of the UE 120a and BS 110a may be used performing the operations described herein.

Example Beam Indications

Quasi-colocation (QCL) signaling can be used for reference signals (RSs) and channels across a number of communication scenarios. Some such scenarios may involve multiple cells, such as coordinated multipoint (CoMP) scenarios. CoMP communication generally involves multiple transmit receive points (TRPs) with integrated access and backhaul (IAB) nodes each having their own cell identification (ID).

QCL assumptions generally refer to assumptions that, for a set of signals or channels considered to be 'QCL related' (or simply "QCL'd" for short), certain characteristics derived for (measured from) one of the signals or channels may be applied to the other. That is, channels and/or signals may be termed QCL'd when characteristics associated with one channel or signal apply to another signal channel or signal. As an example, if PDSCH DMRS is QCL'd with other DL RS, a UE may process PDSCH based on measurements of the other DL RS. In some cases, this may lead to more efficient processing, allowing a UE to use (re-use) previous measurements of the QCL'd RS, which may speed processing of a current channel.

In some cases, QCL assumptions for receptions/transmissions of signals and channels may be signaled via a mechanism referred to as Transmission Configuration Indication (TCI) states. TCI states may also sometimes be referred to as Transmission Configuration Indicator states. In some cases, a UE may be configured with multiple TCI states via radio resource control (RRC) signaling, while one of the TCI states may be indicated by an N bit (e.g., 3-bits) DCI field for PDSCH. A field (e.g., a qcl-info) in an RRC message can list references to TCI States for providing the QCL source and QCL type for associated resources. The TCI states may be indicated by an ID (e.g., a TCI-StateId). An RRC message (e.g., PDSCH-Config field) can contain a field with a list of TCI states indicating a transmission configuration which includes QCL-relationships between the DL RSs in one RS set and the PDSCH DMRS ports. A TCI state associates DL RSs (e.g., one or two) with a corresponding QCL type. A DL BWP and cell, in which the RS is located in may also be indicated.

FIG. 3 illustrates an example of how RSs associated with TCI states may be configured via RRC signaling. The QCL assumptions may be grouped into different types that correspond to the parameters that may be assumed QCL'd for a set of QCL'd signals. For example, for a set of QCL'd signals, Type A may indicate that Doppler shift, Doppler spread, average delay, delay spread can be assumed QCL'd, while Type B may indicate only Doppler shift and Doppler spread, Type C may indicate a still different set of parameters, such as average delay and Doppler shift. In some cases, spatial QCL assumptions (e.g., a spatial TX/RX parameter) may be indicated, for example, by Type D. Spatial QCL may mean a (Tx or Rx) beam selected based on a certain signal measurement may be applied to the QCL related signal. If at least spatial QCL is configured/indicated, an RRC field (e.g., a tci-PresentInDCI field) can indicate if TCI field is present or not present in DL-related DCI and when the field is absent the UE considers the TCI to be absent/disabled.

Further, as illustrated in FIG. 3, TCI states may indicate one or more RSs (e.g., CSI-RS, SSB, etc.) that are QCL'd and an associated QCL type. The TCI state may also indicate a ServCellIndex, which is a short identity used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

In some examples, a UE can be configured with a list of up to M TCI states. UEs can be configured via a higher layer parameter to decode PDSCH according to a detected PDCCH with DCI intended for the UE and the given serving cell, where M depends on the UE capability. Each contains parameters for configuring a QCL relationship between one, two, or more downlink RSs and DM-RS ports of the PDSCH. QCL relationships can be configured by higher layer parameters for the first and second DL RSs, respectively. For the case of two DL RSs, QCL assumption types may not be the same, regardless of whether the references are to the same DL RS or different DL RSs. QCL assumption types corresponding to each DL RS are given by another higher layer parameter and may indicate the QCL type A, QCL type B, QCL type C, or QCL type D.

In some downlink examples, a UE may receive an activation command (e.g., in a MAC-CE). An activation command may be used to map one or more of the higher layer configured TCI states (e.g., up to 8 TCI states) to the codepoints of a TCI field in DCI.

For uplink transmissions, a spatial relation parameter may be used. The spatial relation parameter may configure the spatial relation between a reference RS (e.g., SSB, CSI-RS, and/or SRS) and an uplink transmission (e.g., PUCCH, PUSCH, SRS). The can be configured with a set of spatial relations via higher layer signaling (e.g., RRC). A MAC-CE can be used to select a subset (e.g., a single) spatial relation. From the spatial relation, the UE may decide a UE transmit beam to use for uplink transmission.

Example Avoiding TCI Reselection Due to Active BWP Switching

In certain networks, such as 5G New Radio (NR) network, a user equipment may communicate with the network via one or more cells (e.g., one or more serving cells) and using one or more component carriers (or carrier bandwidths). In 5G, each component carrier may be defined by one or more bandwidth parts (BWPs). In some cases, a bandwidth part may be considered as a contiguous set of physical resource blocks, selected from a contiguous subset of the common resource blocks for a given numerology on a given carrier. In some cases, the UE may be configured with a maximum of four BWPs in the downlink (DL) and uplink (UL) for a given carrier.

Additionally, in certain cases, only one BWP for the given carrier may be active at any given time. For example, assuming that the UE is configured with four BWPs (BWP0, BWP1, BWP2, and BWP3), only one of the four BWPs may be active at a given time while the other BWPs remain inactive. However, while only one BWP may be active at a time, the active BWP may be switched to a different BWP. For example, assuming BWP1 is the active BWP, the active BWP may be switched to, for example, BWP2 or BWP3 based on certain criteria.

In some cases, a UE may be configured with a set of beam indication sets for communicating in one or more BWPs. For uplink transmission, beam indication sets may be spatial relations. For downlink transmission, beam indication sets may be transmission configuration indication (TCI) states. The set of beam indications may be configured for a particular channel or type of transmission. Some UEs may be configured with the beam indication sets by higher layer signaling, such as radio resource control (RRC) signaling. In some examples, a subset of the configured sets may be activated via a medium access control control element (MAC-CE). In some examples, an indication in downlink control information (DCI) may indicate (e.g., via a 3-bit indicator) one of the beam indications for the transmission scheduled by the DCI. The indicated TCI state or spatial relation may indicate to the UE the receive beam or transmit beam to use, respectively.

As noted above, the TCI state may indicate one or more quasi-colocation (QCL) assumptions for receptions/transmissions of signals and channels. The QCL assumptions may be grouped into different types. For example, some types may have characteristics corresponding to one or more parameters that may be assumed QCL'd for a set of QCL'd counterparts (e.g., channels, signals, etc.). As noted, sample different QCL assumption types may include type A, type B, type C, and type D.

In 5G Release 15, for a particular TCI state, QCL type A and type B reference signals (RSs) must be in an active BWP on the serving cell of the UE where the TCI state is configured. However, QCL type C and type D RSs may be in the active BWP of a serving cell that is different from the serving cell where the TCI state is configured.

For example, assume the UE communicates with a first cell on a first component carrier and with a second cell on a second component carrier and that a TCI state is configured for the first cell. Further, assume that, for the first component carrier, the UE is configured with two BWPs (BWP0 and BWP1) with BWP0 being active and that, for the second component carrier, the UE is configured with three BWPs (BWP0, BWP1, and BWP2). For QCL type A and B, the type A and type B RSs must be transmitted within active BWP1 of the first component carrier of the first cell where the TCI state is configured. Since a TCI state is not configured for the second cell, the Type A and Type B RSs may not be transmitted within the second component carrier. However, with QCL type C or D, the RSs associated with these QCL assumption types may be within either the first component carrier of the first cell (e.g., where the TCI state is configured) or within the second component carrier of the second cell (e.g., where the TCI state is not configured).

Additionally, if a TCI state is configured and the RS comprises a channel state information reference signal (CSI- RS), the BWP ID for the RS must also be configured, as illustrated in FIG. 3. For example, as illustrated in FIG. 3, the parameter BWP ID is conditioned for CSI-RS-type RSs. In other words, when the RS is a CSI-RS, the BWP ID for that CSI-RS must be configured in the TCI state.

This restriction/rule that the BWP ID must be configured for CSI-RSs presents an issue for QCL type D CSI-RSs since the TCI state configuration needs to be changed if an active BWP containing the type D CSI-RS changes, even if the active BWP containing a type A RS remains the same. For example, every time that the active BWP containing a type D RS (e.g., CSI-RS) changes, the gNB must choose a new TCI state for the UE, even though the only difference in the TCI state configuration is the BWP ID of the type D RS in the TCI state. Thus, both signaling overhead and the total number of configured TCI states increases, leading to inefficiencies of resource usage in the network such as signaling overhead and power spent having to receive and decode the additional signaling.

Thus, aspects of the present disclosure provide techniques, apparatus, processing systems, and computer readable media, for avoiding TCI state reselecting/reconfiguration due to active BWP switching. Such techniques may be used to reduce signaling overhead and save power at UEs.

Figure 4A:
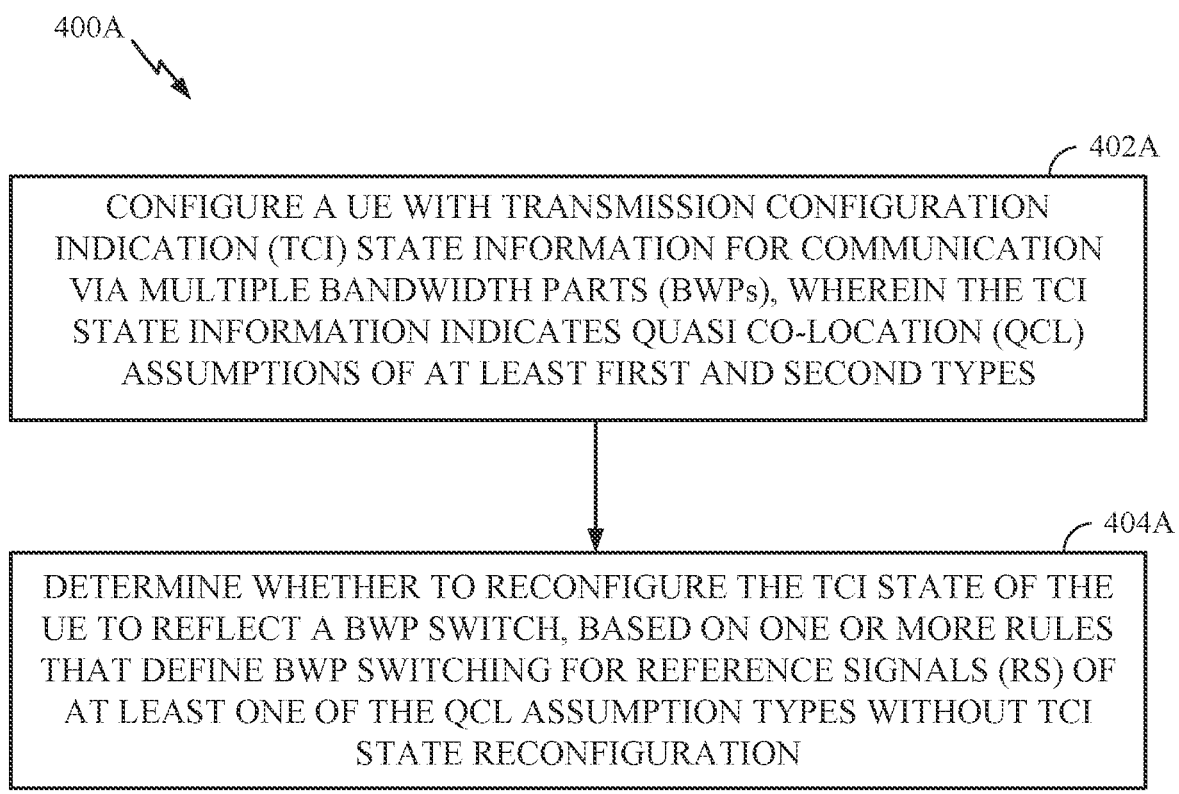
FIG. 4A is a flow diagram illustrating example operations for wireless communication by a network entity, in accordance with certain aspects of the present disclosure.

FIG. 4A is a flow diagram illustrating example operations 400A for wireless communication, in accordance with certain aspects of the present disclosure. The operations 400A may be performed, for example, by a network entity (e.g., such as a BS 110 in the wireless communication network 100). Operations 400A may be implemented as software components that are executed and run on one or more processors (e.g., controller/processor 240 of FIG. 2). Further, the transmission (e.g., configuring a UE) and reception of signals by the network entity may be enabled, for example, by one or more antennas (e.g., antennas 234 of FIG. 2). In certain aspects, the transmission and/or reception of signals by the network entity may be implemented via a bus interface of one or more processors (e.g., controller/processor 240) obtaining and/or outputting signals. Though call-flow or operational descriptions herein may be described as certain actions as steps, the described actions or steps may be preferred in variety of arrangements or orders. By providing example logical descriptions, those of skill in the art will understand various permutations are achievable and possible.

Operations 400A begin at 402A with the network entity configuring a UE with transmission configuration indication (TCI) state information for communication via multiple bandwidth parts (BWPs), wherein the TCI state information indicates quasi co-location (QCL) assumptions of at least first and second types. In some cases, configuring a UE with the TCI state information may include transmitting the TCI state information to the UE.

At 404A, the network entity determines whether to reconfigure the TCI state of the UE to reflect a BWP switch, based on one or more rules that define BWP switching for reference signals (RSs) of at least one of the QCL assumption types without TCI state reconfiguration. In some cases, the BWP switch may comprise a switch of active BWPs. Further, in some cases, operations 400A may further comprise performing the BWP switch.

Figure 4B:
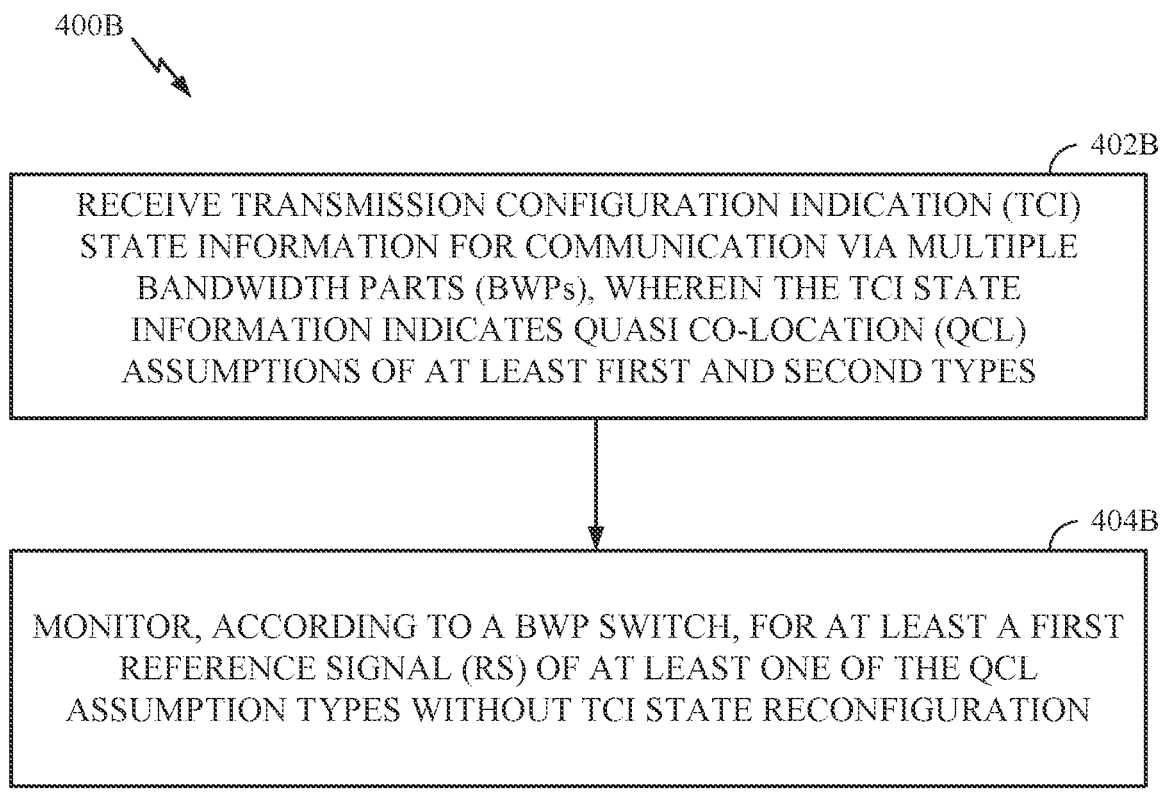
FIG. 4B is a flow diagram illustrating example operations for wireless communication by a user equipment (UE), in accordance with certain aspects of the present disclosure.

FIG. 4B is a flow diagram illustrating example operations 400A for wireless communication, in accordance with certain aspects of the present disclosure. The operations 400B may be performed, for example, by a network entity (e.g., such as a UE 120 in the wireless communication network 100). Operations 400B may be implemented as software components that are executed and run on one or more processors (e.g., controller/processor 280 of FIG. 2). Further, the transmission and reception of signals (e.g., configuration information) by the network entity may be enabled, for example, by one or more antennas (e.g., antennas 252 of FIG. 2). In certain aspects, the transmission and/or reception of signals by the network entity may be implemented via a bus interface of one or more processors (e.g., controller/processor 240) obtaining and/or outputting signals. As noted, though call-flow or operational descriptions herein may be described as certain actions as steps, the described actions or steps may be preferred in variety of arrangements or orders. By providing example logical descriptions, those of skill in the art will understand various permutations are achievable and possible.

Operations 400B begin at 402B with the UE receiving transmission configuration indication (TCI) state information for communication via multiple bandwidth parts (BWPs), wherein the TCI state information indicates quasi co-location (QCL) assumptions of at least first and second types.

At 404B the UE monitors, according to a BWP switch, for at least a first reference signal (RS) of at least one of the QCL assumption types without TCI state reconfiguration. In some cases, operations 400B may further include performing the BWP switch. Additionally, in some cases, the BWP switch may comprise a switch of active BWPs.

As noted, to alleviate the issue with TCI state configuration reselection caused by the BWP ID when an active BWP switches and for type D RSs, the network may determine whether to reconfigure/reselect the TCI state based on one or more rules define (e.g., allow) active BWP switching for RSs of at least one of the QCL assumption types without TCI state reconfiguration.

For example, a first rule may involve allowing for the BWP ID of the RS to be unspecified in the TCI state configuration, resulting in a "floating" BWP ID as described below. For example, in some cases, the active BWP switch may be from a first BWP ID, in which an RS of a first QCL assumption type is supported, to a second BWP ID. In such a case, the first rule may allow for a BWP ID of the RS of the first QCL assumption type to be unspecified so that a TCI state of the UE does not need to be reconfigured, thereby eliminating the additional signaling overhead.

In some cases, the first rule may apply to QCL types A-D, and may be applicable when the RS type is CSI-RS. According to aspects, when the BWP ID is left unspecified (e.g., left to "float"), then the BWP ID of the RS may be assumed to be the BWP ID of the active BWP. For example, in some cases, the first rule may specify that the BWP ID of the RS of the first QCL assumption type is to be the second BWP ID after the active BWP switch. In this case, for example, based on the unspecified BWP ID, the UE may monitor using the first BWP ID as the second BWP ID. Thus, the TCI state configuration may remain the same (i.e., the network node does not need to reconfigure the TCI state) even if the active BWP containing the RS (e.g., Type D RS) changes, thereby reducing signaling overhead and power consumption at the UE. For example, when the BWP ID is left unspecified, determining whether to reconfigure the TCI state of the UE by the BS may include determining not to reconfigure the TCI state of the UE in response to the active BWP switch based, at least in part, on the first QCL assumption type being unspecified. Additionally, the UE may monitor, according to the active BWP switch, for at the RS of the first QCL assumption type without TCI state reconfiguration (e.g., without having to decode and reconfigure with new TCI state information) based on the unspecified BWP ID of the RS.

According to aspects, a second rule, which in some cases may apply to QCL types A-D, may allow for the BWP ID of the RS of at least a first QCL assumption type to be in an inactive BWP. For example, in some cases, the active BWP switch may be from a first BWP ID, in which the RS of the first QCL assumption type is supported, to a second BWP ID. Thus, in this case, the BWP ID of the RS of the first QCL assumption type may remain unchanged as the first BWP ID after the active BWP switch, allowing the TCI state of the UE to remain unchanged. In some cases, the BWP ID may be fixed within the TCI state configuration, Thus, in this case, the BWP ID may remain the fixed BWP ID (i.e., the network node does not need to reconfigure the TCI state) even when the active BWP switches, thereby reducing signaling overhead and power consumption at the UE. For example, when the BWP ID of the RS is allowed to be in an inactive BWP, determining whether to reconfigure the TCI state of the UE by the BS may include determining not to reconfigure the TCI state of the UE in response to the active BWP switch based, at least in part, on the unchanged first BWP ID. Additionally, the UE may monitor, according to the active BWP switch, for at the RS of the first QCL assumption type without TCI state reconfiguration (e.g., without having to decode and reconfigure with new TCI state information) based on the unchanged first BWP ID (e.g., due to the first QCL assumption type being allowed to be in an inactive BWP).

According to aspects, a third rule, which in some cases may apply to may apply to QCL type C and type D, may specify that the type of RS may not be an RS that has an associated BWP ID. For example, in some cases, the active BWP switch may be from a first BWP ID, in which an RS of the first QCL assumption type is supported, to a second BWP ID. In this case, the third rule may specify that the RS of the first QCL assumption type is to be a certain type of RS that does not have an associated BWP ID so the TCI state of the UE does not need to be reconfigured. For example, in some cases, the type of the RS may be a synchronization signal block (SSB)-based RS, which may not have an associated BWP ID in the TCI state configuration (e.g., as illustrated in FIG. 3). Thus, in this case, the TCI state configuration may remain the same (i.e., the network node does not need to reconfigure the TCI state) even if an active BWP in the serving cell containing the RS changes, thereby reducing signaling overhead and power consumption at the UE. For example, based, at least in part, on the certain type of RS that does not have an associated BWP ID, determining whether to reconfigure the TCI state of the UE by the BS may include determining not to reconfigure the TCI state of the UE in response to the active BWP switch. Additionally, the UE may monitor, according to the active BWP switch, for at the RS of the first QCL assumption type without TCI state reconfiguration (e.g., without having to decode and reconfigure with new TCI state information), for example, based on the certain type of RS that does not have an associated BWP ID.

According to aspects, a fourth rule, which in some cases may apply to QCL type C and type D, may specify that the active BWP containing a QCL RS must remain fixed (i.e., no switching is allowed). That is, for example, the fourth rule may prevent an active BWP switch from an active BWP in which an RS of at least a first QCL assumption type is supported. In this case, the active BWP switch may performed in accordance with the fourth rule. Thus, in this case, the TCI state configuration may remain the same (i.e., the network node does not need to reconfigure the TCI state) since the BWP ID for the RS is fixed, thereby reducing signaling overhead and power consumption at the UE. For example, the UE may monitor, according to the active BWP switch, for at the RS of the first QCL assumption type without TCI state reconfiguration (e.g., without having to decode and reconfigure with new TCI state information).

Figure 5:
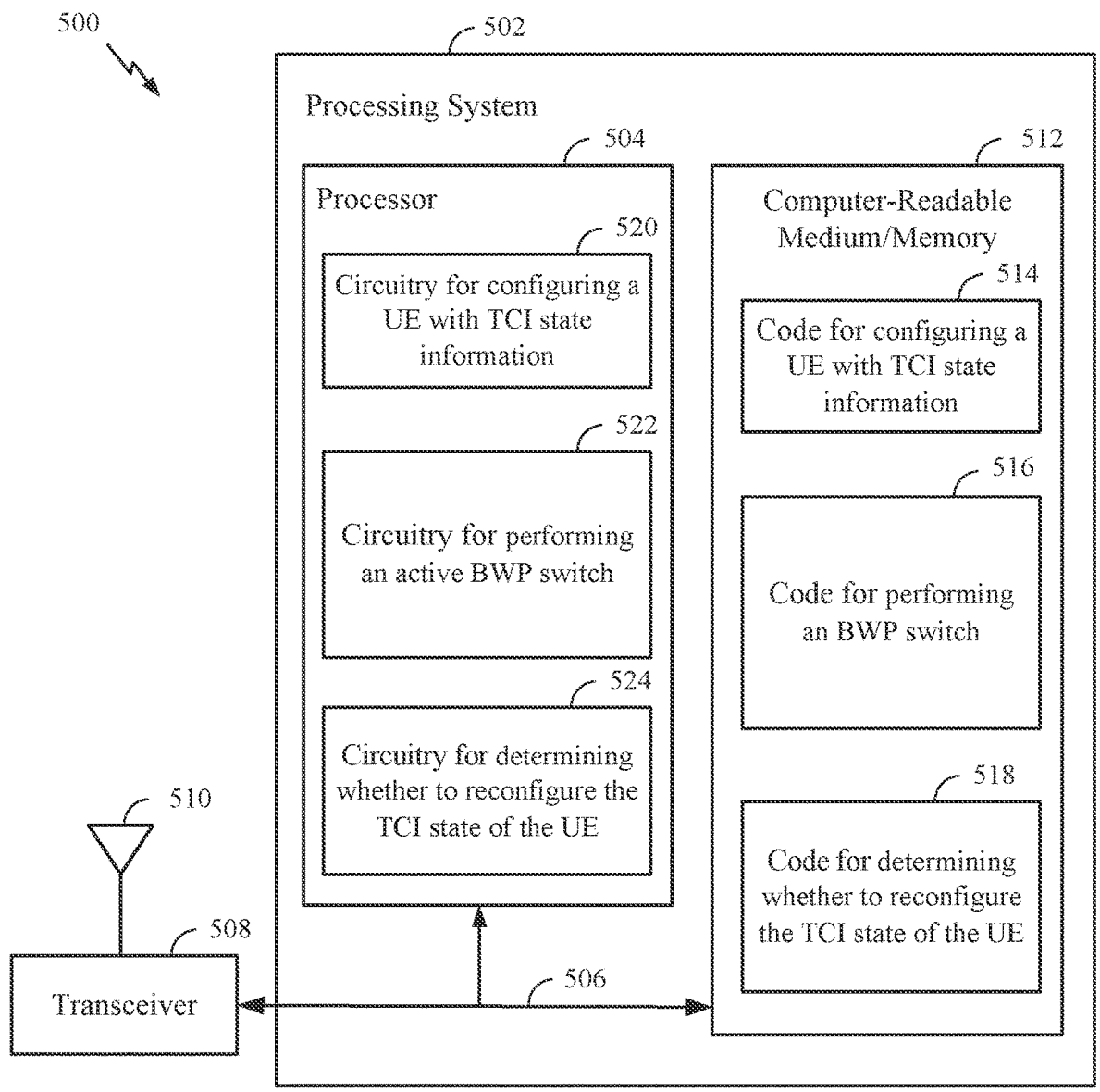
FIG. 5 illustrates a communications device that may include various components configured to perform operations for the techniques disclosed herein in accordance with aspects of the present disclosure.

FIG. 5 illustrates a communications device 500 that may include various components (e.g., corresponding to means-plus-function components). One or more of these components can be configured to perform operations for the techniques disclosed herein, such as the operations illustrated in FIG. 4A. The communications device 500 includes a processing system 502 coupled to a transceiver 508. The transceiver 508 is configured to transmit and receive signals for the communications device 500 via an antenna 510, such as the various signals as described herein. The processing system 502 may be configured to perform processing functions for the communications device 500, including processing signals received and/or to be transmitted by the communications device 500.

The processing system 502 includes a processor 504 coupled to a computer-readable medium/memory 512 via a bus 506. In certain aspects, the computer-readable medium/memory 512 is configured to store instructions (e.g., computer-executable code) that when executed by the processor 504, cause the processor 504 to perform the operations illustrated in FIG. 4A, or other operations for performing the various techniques discussed herein for avoiding TCI reselecting due to Active BWP switching. In certain aspects, computer-readable medium/memory 512 stores code 514 for configuring a UE with transmission configuration indication (TCI) state information for communication via multiple bandwidth parts (BWPs), wherein the TCI state information indicates quasi co-location (QCL) assumptions of at least first and second types; code 516 for performing an active BWP switch; and code 518 for determining whether to reconfigure the TCI state of the UE to reflect the active BWP switch, based on one or more rules that allow active BWP switching for reference signals (RSs) of at least one of the QCL assumption types without TCI state reconfiguration. In certain aspects, the processor 504 includes circuitry configured to implement the code stored in the computer-readable medium/memory 512. For example, the processor 504 includes circuitry 520 for configuring a UE with transmission configuration indication (TCI) state information for communication via multiple bandwidth parts (BWPs), wherein the TCI state information indicates quasi co-location (QCL) assumptions of at least first and second types; circuitry 522 for performing an active BWP switch; and circuitry 524 for determining whether to reconfigure the TCI state of the UE to reflect the active BWP switch, based on one or more rules that allow active BWP switching for reference signals (RSs) of at least one of the QCL assumption types without TCI state reconfiguration.

Figure 6:
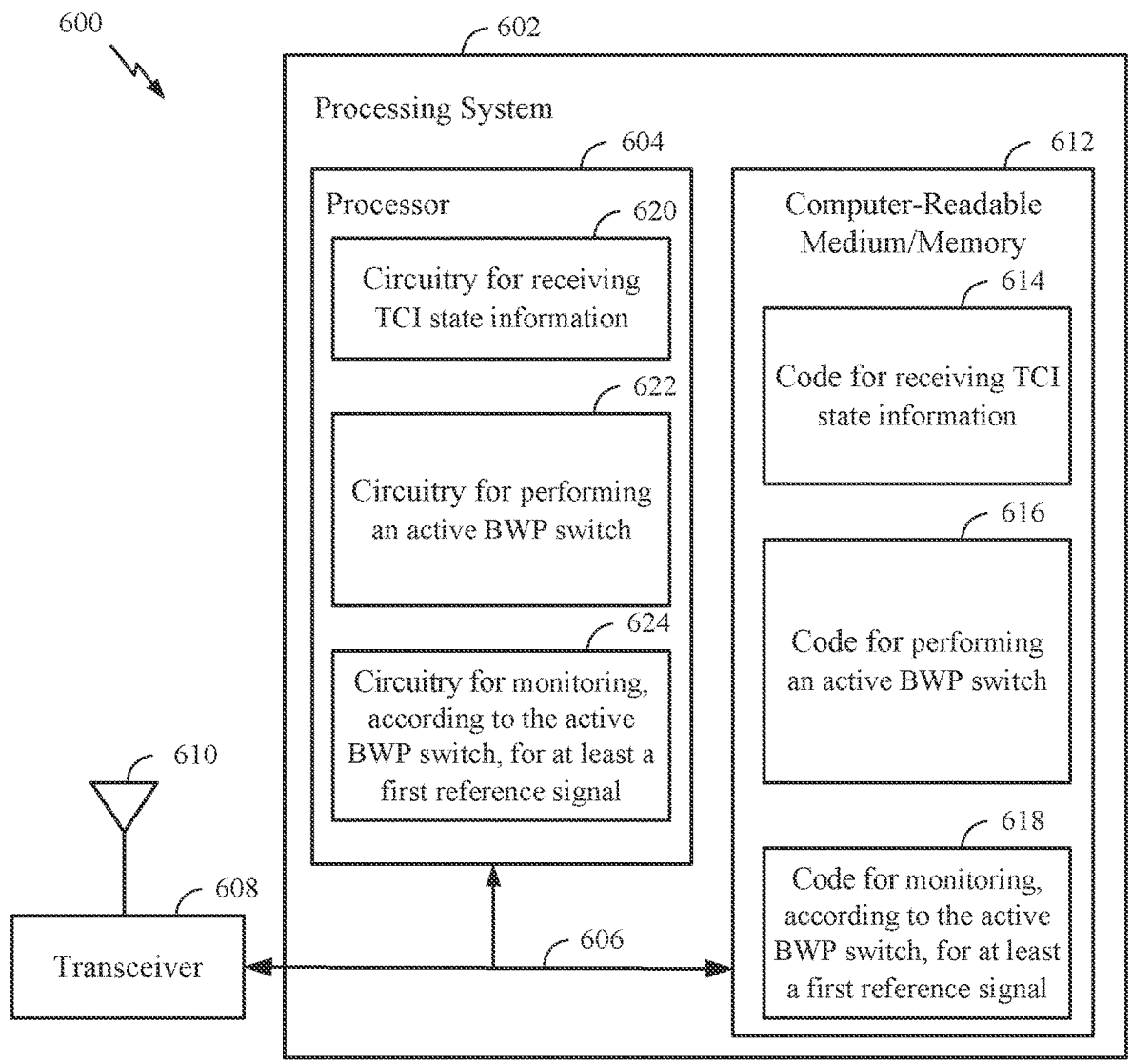
FIG. 6 illustrates a communications device that may include various components configured to perform operations for the techniques disclosed herein in accordance with aspects of the present disclosure.

FIG. 6 illustrates a communications device 600 that may include various components (e.g., corresponding to means-plus-function components) configured to perform operations for the techniques disclosed herein, such as the operations illustrated in FIG. 4B. The communications device 600 includes a processing system 602 coupled to a transceiver 608. The transceiver 608 is configured to transmit and receive signals for the communications device 600 via an antenna 610, such as the various signals as described herein. The processing system 602 may be configured to perform processing functions for the communications device 600, including processing signals received and/or to be transmitted by the communications device 600.

The processing system 602 includes a processor 604 coupled to a computer-readable medium/memory 612 via a bus 606. In certain aspects, the computer-readable medium/memory 612 is configured to store instructions (e.g., computer-executable code) that when executed by the processor 604, cause the processor 604 to perform the operations illustrated in FIG. 4B, or other operations for performing the various techniques discussed herein for avoiding TCI reselecting due to Active BWP switching. In certain aspects, computer-readable medium/memory 612 stores code 614 for receiving transmission configuration indication (TCI) state information for communication via multiple bandwidth parts (BWPs), wherein the TCI state information indicates quasi co-location (QCL) assumptions of at least first and second types; code 616 for performing an active BWP switch; and code 618 for monitoring, according to the active BWP switch, for at least a first reference signal (RS) of at least one of the QCL assumption types without TCI state reconfiguration. In certain aspects, the processor 604 includes circuitry configured to implement the code stored in the computer-readable medium/memory 612. For example, the processor 604 includes circuitry 620 for receiving transmission configuration indication (TCI) state information for communication via multiple bandwidth parts (BWPs), wherein the TCI state information indicates quasi co-location (QCL) assumptions of at least first and second types; circuitry 622 for performing an active BWP switch; and circuitry 624 for monitoring, according to the active BWP switch, for at least a first reference signal (RS) of at least one of the QCL assumption types without TCI state reconfiguration.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a–b, a–c, b–c, and a–b–c, as well as any combination with multiples of the same element (e.g., a–a, a–a–a, a–a–b, a–a–c, a–b–b, a–c–c, b–b, b–b–b, b–b–c, c–c, and c–c–c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 4A and 4B.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A first network entity for wireless communication, comprising:
a communication interface; and
one or more processors coupled to the communication interface, wherein the first network entity is configured to:
configure a second network entity with transmission configuration indication (TCI) state information for communication, wherein the TCI state information indicates a quasi co-location (QCL) type assumption; and
transmit, based on a rule that allows for a bandwidth part (BWP) identifier (ID) of a respective RS of one or more reference signals (RSs) to be unspecified in the TCI state information, the one or more RSs of the QCL type assumption.

2. The first network entity of claim 1, wherein the first network entity is configured to not reconfigure a TCI state of the second network entity based on the BWP ID of the respective RS being unspecified.

3. The first network entity of claim 1, wherein the rule allows for the BWP ID of the respective RS to be in an inactive BWP.

4. The first network entity of claim 1, wherein the first network entity is configured to not reconfigure a TCI state of the second network entity based on the respective RS not having an associated BWP ID.

5. The first network entity of claim 4, wherein the respective RS comprises a synchronization signal block (SSB)-based RS.

6. A method of wireless communication performed by a first network entity, comprising:
configuring a second network entity with transmission configuration indication (TCI) state information for communication, wherein the TCI state information indicates a quasi co-location (QCL) type assumption; and
transmitting, based on a rule that allows for a bandwidth part (BWP) identifier (ID) of a respective RS of one or more reference signals (RSs) to be unspecified in the TCI state information, the one or more RSs of the QCL type assumption.

7. The method of claim 6, further comprising not reconfiguring a TCI state of the second network entity based on the BWP ID of the respective RS being unspecified.

8. The method of claim 6, wherein the rule allows for the BWP ID of the respective RS to be in an inactive BWP.

9. The method of claim 6, further comprising not reconfiguring a TCI state of the second network entity based on the respective RS not having an associated BWP ID.

10. The method of claim 9, wherein the respective RS comprises a synchronization signal block (SSB)-based RS.

11. A first network entity for wireless communication, comprising:
a communication interface; and
one or more processors coupled to the communication interface, wherein the first network entity is configured to:
receive transmission configuration indication (TCI) state information for communication from a second network entity, wherein the TCI state information indicates a quasi co-location (QCL) type assumption; and
receive, based on a rule that allows for a bandwidth part (BWP) identifier (ID) of a respective RS of one or more reference signals (RSs) to be unspecified in the TCI state information, the one or more reference signals (RSs) of the QCL type assumption.

12. The first network entity of claim 11, wherein the first network entity is configured to determine not to reconfigure a TCI state based on the BWP ID of the respective RS being unspecified.

13. The first network entity of claim 11, wherein the rule allows for the BWP ID of the respective RS to be in an inactive BWP.

14. The first network entity of claim 11, wherein the first network entity is configured to determine not to reconfigure a TCI based on the respective RS not having an associated BWP ID.

15. The first network entity of claim 14, wherein the respective RS comprises a synchronization signal block (SSB)-based RS.

16. A method of wireless communication performed by a first network entity, comprising:
 receiving transmission configuration indication (TCI) state information for communication from a second network entity, wherein the TCI state information indicates a quasi co-location (QCL) type assumption; and
 receiving, based on a rule that allows for a bandwidth part (BWP) identifier (ID) of a respective reference signal (RS) of one or more RSs to be unspecified in the TCI state information, the one or more of the RSs of the QCL type assumption.

17. The method of claim 16, further comprising determining not to reconfigure a TCI state based on the BWP ID of the respective RS being unspecified.

18. The method of claim 16, wherein the rule allows for the BWP ID of the respective RS to be in an inactive BWP.

19. The method of claim 16, further comprising determining not to reconfigure a TCI state based on the respective RS not having an associated BWP ID.

20. The method of claim 19, wherein the respective RS comprises a synchronization signal block (SSB)-based RS.

21. A non-transitory computer-readable medium having code stored thereon that, when executed by at least one processor of a first network entity, causes the first network entity to:
 configure a second network entity with transmission configuration indication (TCI) state information for communication, wherein the TCI state information indicates a quasi co-location (QCL) type assumption; and
 transmit, based on a rule that allows for a bandwidth part (BWP) identifier (ID) of a respective RS of one or more reference signals (RSs) to be unspecified in the TCI state information, the one or more RSs of the QCL type assumption.

22. The non-transitory computer-readable medium of claim 21, wherein the code, when executed by the at least one processor of the first network entity, causes the first network entity to not reconfigure a TCI state of the second network entity based on the BWP ID of the respective RS being unspecified.

23. The non-transitory computer-readable medium of claim 21, wherein the rule allows for the BWP ID of the respective RS to be in an inactive BWP.

24. The non-transitory computer-readable medium of claim 21, wherein the code, when executed by the at least one processor of the first network entity, causes the first network entity to not reconfigure a TCI state of the second network entity based on the respective RS not having an associated BWP ID.

25. The non-transitory computer-readable medium of claim 24, wherein the respective RS comprises a synchronization signal block (SSB)-based RS.

* * * * *